United States Patent [19]

Bluestein et al.

[11] 3,873,484

[45] Mar. 25, 1975

[54] LATEX OF QUATERNIZED POLYETHER-DIALKANOLAMINE POLYISOCYANATE PREPOLYMER CHAIN EXTENDED WITH WATER WITH ETHOXYLATED PHENOL, AND CURED PRODUCTS

[75] Inventors: Claire Bluestein, Glen Rock; Peter Loewrigkeit, Wyckoff, both of N.J.

[73] Assignee: Whitco Chemical Corporation, New York, N.Y.

[22] Filed: Dec. 6, 1972

[21] Appl. No.: 312,435

[52] U.S. Cl... 260/29.2 TN, 161/190, 260/77.5 AQ, 260/77.5 Q
[51] Int. Cl... C08g 51/24, C08g 22/14, B32b 27/40
[58] Field of Search............................ 260/29.2 TN

[56]  References Cited
UNITED STATES PATENTS

| | | |
|---|---|---|
| 3,178,310 | 4/1965 | Berger et al. .................... 117/142 |
| 3,479,310 | 11/1969 | Dieterich et al............. 260/29.2 TN |
| 3,480,592 | 11/1969 | Dieterich et al............. 260/29.2 TN |

*Primary Examiner*—Murray Tillman
*Assistant Examiner*—Arthur H. Koeckert
*Attorney, Agent, or Firm*—Albert L. Gazzola, Esq.; Jordan J. Driks, Esq.; Morton Friedman, Esq.

[57]  ABSTRACT

Stable aqueous dispersions or latices prepared from a quaternized substantially linear isocyanate terminated polyetherurethane prepolymer, prepared by reacting a mixture of about one equivalent of an alkoxylated diol or triol and about one hydroxyl equivalent of an N-alkyl dialkanolamine with about four equivalents of a diisocyanate; substantially 0.5 equivalents of a dialkyl sulfate is used to quaternize, said prepolymer is chain extended into the corresponding urea and at the same time dispersed with water in the presence of a nonionic emulsifier of the alkoxylated long chain alkyl phenol type having an HLB of about 14–16. Up to about 20% w/w of an inert substantially dry, organic solvent, such as acetone, may be used in the preparation of the quaternized polyetherurethane prepolymer, which is largely or completely replaced with water to yield a substantially aqueous stable dispersion of quaternized polyetherurethane-urea, having a pH of about 2.0–3.0. Substantially odor-free films and adhesives having improved solvent resistance and physical and mechanical properties are made from the present aqueous dispersions or latices.

14 Claims, No Drawings

LATEX OF QUATERNIZED POLYETHER-DIALKANOLAMINE POLYISOCYANATE PREPOLYMER CHAIN EXTENDED WITH WATER WITH ETHOXYLATED PHENOL, AND CURED PRODUCTS

This invention relates to stable aqueous dispersions, hereafter called latices or latex, if in the singular, of particular quaternized linear polyether-urethane-ureas, which produce adhesives and films having improved physical and mechanical properties and which are particularly resistant to attack by water and organic solvents such as chlorinated hydrocarbon solvents used in drycleaning. Generally the properties of the films produced by the present latices are similar to those of solvent based polyurethanes, i.e., polyurethane lacquers.

It is already known that quaternized polyurethanes can be converted into latices from which films and adhesives can be made. According to the art, the polyurethane is prepared with or without the aid of an inert organic solvent, and if a solvent is added, it is replaced by the water in which the polyurethane is dispersed.

When preparing aqueous dispersions of a quaternized polyurethane compositions made by reacting a polyether polyol with organic diisocyanate and a dialkanolamine, according to the prior art methods, the quaternary polyurethane tends to settle out on standing for a few days. A latex which is originally highly fluid and finely divided may become completely lumpy or curdled in many cases, even after a few hours. Moreover the latex is not always reproduceable.

Films produced by the known polyurethane latices are often overly water soluble and although a cohesive film may be formed, it usually has one or more other poor physical and/or mechanical properties, i.e., not firm, blemished, poorly cohesive, poor solvent resistance, tacky, cloudy, poor tensile strength, etc., which render the film or adhesive commercially unfeasible.

Moreover, the art teaches that when non-ionic surfactants are employed to prepare quaterized polyurethane latices, they render the films and adhesives made from these polyurethane latices less resistant to solvent attack particularly by water, as is set forth in the disclosure of Dieterich et al in U.S. Pat. No. 3,479,310, column 1; this patent is incorporated herein by reference. It is indeed surprising therefore, that a polyurethane latex formulation, containing a non-ionic surfactant as herein described, can be used for making adhesives and films, which besides having excellent mechanical properties, are strongly resistant to solvent attack. These desirable properties of the films and adhesives made from the present polyetherurethane-urea latices, render them particularly useful for application in the coating and lamination of fabrics. The films or adhesives on the fabric retain their physical and mechanical properties even after repeated water washings and drycleaning. Moreover, because the present polyetherurethane-urea latices are water based, residual solvent odor on a finished fabric is no longer a problem, nor is there a problem of air pollution by the evaporating solvent during the processing of the latex into a film or adhesive, as is the case with polyurethane lacquers. Furthermore the absence of evaporating solvent negates the potential fire hazard of the solvent vapors from the film-forming process.

Polyurethane latex compositions of the prior art are described in U.S. Pat. No. 3,388,087, issued to Dieterich et al on June 11, 1968 and U.S. Pat. No. 3,410,817 issued to McClellan on Nov. 12, 1968; U.S. Pat. No. 3,479,310, cited hereinbefore, also issued to Dieterich et al on Nov. 18, 1969; U.S. Pat. No. 3,565,844 issued to Grace et al. on Feb. 29, 1971; and British Pat. specification No. 1,143,309, to Farbenfabriken Bayer, complete specification published Feb. 19, 1969. Although these patents contributed to the advance of the art, none propose the particular latex as hereinafer described and claimed, nor do they disclose an adhesive or film made from the present latex having unexpected improved solvent resistance and good physical and mechanical properties.

According to the present invention a storage stable latex, i.e., stable at ambient temperatures for at least four months, of a particular substantially linear isocyanate terminated quaternized polyetherurethane-urea, prepared in a specific manner and with specific proportions of ingredients, and employing a particular nonionic surfactant, is made possible, from which adhesives and films of excellent solvent resistance and improved physical and mechanical properties can be made.

The substantially linear quaternized polyetherurethane prepolymer of the present latex, is prepared by reacting in particular proportions of equivalents, and in a particular manner, an alkoxylated diol or triol, or mixtures thereof, a dialkanolamine, a diisocyanate, and a dialkyl sulfate quaternizing agent. The quaternized polyetherurethane prepolymer is chain extended to form a polyetherurethane-urea, and dispersed in water, at the same time, in the presence of a particular nonionic surfactant. The nonionic surfactants herein employed belong to the class of alkoxylated long chain alkyl phenols having an HLB of between about 14 and 16, as hereinafter more fully described. It is surprising that only these nonionic surfactants are effective in the present invention. Other non-ionics tested are not effective and are not included in the scope of the present invention.

The isocyanate terminated quaternary polyetherurethane prepolymer may be prepared employing no solvent at all, or with as little as up to about 20% of an inert organic solvent if need be. A catalyst such as dibutyltin dilaurate may be employed, as known in the art, to stimulate the formation of the polyurethane. It is chain extended and dispersed in water in the presence of about 0.5–5.0% of the nonionic surfactant, based on the polyetherurethane, and thereafter the bulk of said organic solvent, if present, is removed. The polyetherurethane-urea latex thus produced may be used immediately to make adhesives and films, or it may be stored at ambient temperatures for several months until ready for use.

It is an advantage of the present invention that the films and adhesives can be produced using the present latex at ambient temperatures, although elevated temperatures may be employed of up to about 150°C., or even higher. At elevated temperatures the process of film-forming may be complete in about 1–5 minutes depending on the thickness of the film. In order to insure that a film is not impaired by the heat applied, however, it is preferred to employ a temperature of less than about 110°C. When the film is formed at room temperature, it is preferred to condition it at elevated temperatures for several minutes.

The isocyanate terminated substantially linear quaternized polyetherurethane employed in making the latex of the present invention, is prepared by treating a specific quantity of a polyol having a hydroxyl number of about 20 to 200, such as about one equivalent of an alkoxylated diol, such as polyoxyethylene and polyoxypropylene glycol, and/or about one equivalent of an alkoxylated triol, such as polypropoxylated trimethylol propane and polypropoxylated glycerol, for instance, and about one hydroxyl equivalent of an N-alkyl dialkanolamine such as N-methyldiethanolamine, with about 4 equivalents of an organic diisocyanate, such as tolylene diisocyanate, and quaternizing with about 0.5 equivalents of a monofunctional quaternizing agent such as dimethyl sulfate. The NCO content of the resultant prepolymer is generally within the range of about 2.0%–5.5%.

The present latex is prepared by chain extending and dispersing the resultant isocyanate terminated quaternized polyetherurethane prepolymer with water to the polyetherurethane-urea in the presence of from about 0.5–5.0% of an alkoxylated long chain alkyl phenol surfactant, based on the polyetherurethane prepolymer, such as ethoxylated nonyl phenol containing about 15 ethoxy groups, and removing the bulk of organic solvent if a solvent is used. A thickening agent such as methyl cellulose, polyvinyl alcohol, or polyacrylic acid may be added to this dispersion in sufficient quantity to produce a desired thickness of the dispersion, as known in the art. It is an important advantage of the present invention that the polyetherurethane-urea latex is readily reproducible and thus commercially practical.

The proportion of equivalents, as stated above, of polyol, N-alkyl alkanolamine, diisocyanate, and dialkyl sulfate, to produce the isocyanate terminated quaternized substantially linear polyetherurethane prepolymer from which stable latices and improved films can be reproducibly prepared, includes the following ranges:

| | |
|---|---|
| Polyalkoxylated diol or triol | 0.8–1.2 equiv. |
| N-alkyl dialkanolamine | 0.8–1.2 equiv. |
| Diisocyanate | 3.0–5.0 equiv. |
| Dialkyl sulfate | 0.4–0.6 equiv. |

In a further preferred embodiment, a slight excess of monofunctional dialkyl sulfate quaternizing agent, based on the equivalents of tertiary amine present in the polyetherurethane, is employed. When the proportion of equivalents of the components of the polyetherurethane prepolymer fall in the outer fringes of the above ranges, the latices prepared are substantially stable, but the properties of the adhesives and films made from these latices are not readily reproducible particularly with respect to solvent resistance, and such proportions are not preferred.

The polyol in the present composition can be an alkoxylated diol or an alkoxylated triol, as stated above, having a hydroxyl number in the range of about 10–200 and preferably about 20–80, and accordingly, a preferred molecular weight in the range of about 1,000–6,000.

The N-alkyl group of the N-alkyl dialkanolamine can be lower alkyl, i.e., methyl, ethyl, propyl, isopropyl, etc., having up to six carbon atoms; N-methyl diethanolamine, being of low cost and ready availability being preferred, although other N-alkyl dialkanolamines such as N-methyl dipropanolamine and N-methyl diisopropanolamine, for instance, can also be used as the source of tertiary amine.

Any suitable diisocyanate or mixtures thereof may be employed, such as tolylene diisocyanate 4,4'-diphenylmethane diisocyanate, xylylene diisocyanate, 1, 5-naphthalene diisocyanate, for example. Aliphatic and cycloaliphatic diisocyanates may be employed, such as 1,6-hexmethylenediisocyanate, 4,4'-dicyclohexylmethyl diisocyanate and isophorone diisocyanate, for example. The diisocyanate is added in excess and preferably about two equivalents in excess, as hereinbefore set forth. Of the available diisocyanates, tolylene diisocyanate, and 4,4'-dicylohexylmethyl diisocyanate are preferred.

The monofunctional quaternizing agent can be a lower dialkyl sulfate, such as methyl, ethyl, propyl, isopropyl, etc., having up to six carbon atoms, the dimethyl sulfate because of ready availability and low cost, being preferred.

Any suitable inert organic solvent can be used to prepare the quaternized polyetherurethane prepolymer, acetone being preferred because it is water soluble, readily available and of low cost. Others which can be used include tetrahydrofuran, dimethylformamide, ethyl acetate, benzene, dioxane, and the like. It is preferred to employ a solvent having a boiling point in the range of about 40°–90°C., to facilitate separation of the solvent from water. It is preferred to use less than about 20% w/w of the solvent. Higher quantities may be employed by the artisan, within practical limits, but not as a preference.

The alkoxylated long chain alkyl phenol surfactants having an HLB of about 14–16 which are employed, to aid in chain-extension and dispersion of the present quaternized polyetherurethane prepolymer in water, can be an ethoxylated octyl phenol, ethoxylated nonyl phenol, ethoxylated dodecyl phenol, and the like, sold under the trade names of "Igepal", by the GAF Corporation and "Emcol" by the Witco Chemical Corporation, for instance. Ethoxylated nonyl phenol and ethoxylated dodecyl phenol each having about 15 ethoxy groups, for example Igepal CO-730 and Emcol 3115, respectively, are preferred.

The present latex is prepared using sufficient water to complete the chain extension and to make about a 30–65% dispersion wt/wt. An amine catalyst, such as triethylene diamine as known in the art, may be added to accelerate the chain extension. As stated above, a thickening agent such as methyl cellulose, polyvinyl alcohol, or polyacrylic acid, for instance, may be added to adjust to the viscosity requirements in each case. The amount of thickening agent employed depends upon the degreee of viscosity desired and varies accordingly. The thickening agent, as known in the art is added dissolved or dispersed in water, to the desired viscosity.

Anti-foam agents, may be added in the present latex to reduce foaming, and when color and light stability of the final film is required, antioxidants and U.V. screening agents may be added. Glycols may also be added to lower the freezing point of the latex. Such agents are well known in the art and require no further discussion herein.

The latex of quaternized substantially linear polyetherurethane-urea is stable at ambient temperatures and is reproducible in consistency as are the films and adhesives made thereby.

The following examples illustrate specific embodiments of the present invention and are not intended to be limiting thereto.

EXAMPLE I

| | | Weight (grams) | Equivalent |
|---|---|---|---|
| (1) | Polyoxypropylene glycol of M.W. 2000 having a hydroxyl number of 56. | 100 | 0.100 |
| (2) | N-methyl diethanolamine | 5.95 | 0.100 |
| (3) | Tolylene diisocyanate (80% 2,4- and 20% 2,6-) | 34.80 | 0.400 |
| (4) | Dimethyl sulfate | 6.30 | 0.050 |
| (5) | Acetone (dry) | 15 | — |

A 500 ml. four necked flask equipped with stirrer, thermometer, and gas inlet tube is charged with the polyoxypropylene glycol (1) which is heated to 80°C. and dehydrated under reduced pressure using a water aspirator for 0.5 hour. After dehydration the flask is cooled to about 25°C. and blanketed with $N_2$ before the N-methyl diethanolamine (2) is introduced, after which the tolylene diisocyanate (3) is added with good stirring. An exotherm develops which brings the reaction temperature from 25°C. to about 55°C. This temperature is maintained for about 1½ hours. At this time the dimethyl sulfate (4) and acetone (5) are added producing another exotherm which carries to 70°C. After another hour of reaction at between 60° and 70°C., the NCO content of the quaternized polyetherurethane prepolymer is about 5.0% (theoretical 5.2%).

EXAMPLE II

| | | Weight (grams) | Equivalent |
|---|---|---|---|
| (1) | Polyoxypropylene glycol of M.W. 2000 having a hydroxyl number of 56 | 100 | 0.100 |
| (2) | N-methyl diethanolamine | 5.95 | 0.100 |
| (3) | Methylene bis-cyclohexyl diisocyanate | 52.5 | 0.4 |
| (4) | Dimethyl sulfate | 6.30 | 0.050 |
| (5) | Acetone (dry) | 15 | — |

A quaternized polyetherurethane prepolymer is prepared as in Example I, using one drop of dibutyltin dilaurate catalyst to the mixture of (1) (2) and (3).

EXAMPLE III

| | | Weight (grams) | Equivalent |
|---|---|---|---|
| (1)a- | Polyoxypropylene glycol of M.W. 2000 having a hydroxyl number of 56. | 100 | 0.1 |
| b- | Polyoxypropylene glycerol of M.W. 6200 having a hydroxyl number of about 28. | 103 | 0.05 |

EXAMPLE III-Continued

| | | Weight (grams) | Equivalent |
|---|---|---|---|
| (2) | N-methyl diethanolamine | 8.95 | 0.15 |
| (3) | Tolylene diisocyanate (80% 2,4- and 20% 2,6-) | 52.3 | 0.6 |
| (4) | Dimethyl sulfate | 9.0 | 0.075 |
| (5) | Acetone (dry) | 30 | — |

A quaternized polyetherurethane prepolymer is prepared as in Example 1.

EXAMPLE IV

Example I is repeated without solvent. The NCO content of the product is about 5.1 (theoretical 5.2%).

EXAMPLE V

A. The quaternized polyetherurethanes of Examples I, III and IV are converted to the respective latices by the general procedure of mixing the quaternized polyurethane prepolymer into a 500 ml. resin kettle equipped with stirrer and thermometer. To the prepolymer is added 2 weight percent Igepal CO730 (ethoxylated nonyl phenol from GAF) and the mixture is stirred for 10 minutes. Enough deionized water is introduced rapidly with vigorous stirring in order to produce a 30–65% solids dispersion. An immediate evolution of $CO_2$ gas and development of an exotherm from 25° to 34°C. is noted. Foaming may be reduced to a negligible level by the addition of an antifoam agent. The latex thus prepared is stirred for about 1 hour, followed by water aspirator vacuum stripping of acetone at room temperature over a 1 hour period. The resulting latex has good mechanical and aging stability. When the solids content is about 45%, the viscosity is about 15 centipoises, at 60% the viscosity is about 900 centipoises.

An alternate method for the preparation of polyurethane latex is accomplished by first mixing deionized water and Igepal CO730 in a 500 ml. resin kettle. The quaternized polyetherurethane is stirred in with vigorous agitation. No differences could be detected in the final emulsions prepared by the two methods.

B. When converting the quaternized polyetherurethane of Example IV to the latex, the step of removing the solvent (acetone) is eliminated.

C. The quaternized polyetherurethane of Example II is converted to a latex as in (A) above, using a drop or two of a 33% solution of triethylene diamine in diethylene glycol catalyst in the water to accelerate chain extension.

The pH of the above latices is in the range of about 2.0–3.0. They remain substantially physically stable after standing at room temperature for at least four months. The pH may be adjusted, before use, with ammonium hydroxide for instance, up to about pH of 10, without adversely affecting film properties.

EXAMPLE VI

Films are cast, using the latices of Example V, on a self-releasing smooth surface, such as a clear glass plate or a Mylar sheet which had been stretched out and taped down. The cast films are dried overnight and then conditioned for about 10 minutes at about 100°C.

Properties of these films are shown in Table A, below, using the accepted procedures of the American Society for Testing and Materials.

TABLE A

|  | Films from Latices of: | | | |
| --- | --- | --- | --- | --- |
|  | Ex. I | Ex. II | Ex. III | Ex. IV |
| Weight loss after 24 hrs. in 70°C. $H_2O$ | 5.6% | 8.3% | 4.2% | 5.3% |
| Shore A-2 Hardness | 80–82 | 86–89 | 80–82 | 80–82 |
| Tensile Strength | 1800 psi | 4200 psi | 1200 psi | 1850 psi |
| % Ultimate Elongation | 690% | 700% | 650% | 650% |

The above films are clear and non-tacky.

EXAMPLE VII

|  |  | Weight (grams) | Equivalent |
| --- | --- | --- | --- |
| (1) | Polyoxypropylene glycerol of M.W. 6200 having a hydroxyl number of 28. | 206 | 0.1 |
| (2) | N-Methyl diisopropanolamine | 5.9 | 0.08 |
| (3) | 4,4'-Diphenyl methane diisocyanate | 45 | 0.36 |
| (4) | Dimethyl sulfate | 5.67 | 0.045 |
| (5) | Ethyl acetate | 40 |  |

A quaternized polyetherurethane prepolymer is prepared as in Example I, and a latex is prepared as in Example V.

EXAMPLE VIII

|  |  | Weight (grams) | Equivalent |
| --- | --- | --- | --- |
| (1) | Polyoxypropylene glycol | 80.0 | 0.08 |
| (2) | N-Methyl diisopropanolamine | 8.82 | 0.12 |
| (3) | Tolylene diisocyanate (80% 2,4- and 20% 2,6-) | 34.80 | 0.4 |
| (4) | Diethyl sulfate | 9.24 | 0.06 |
| (5) | Ethyl acetate | 20 |  |

A quaternized polyether urethane prepolymer is prepared as in Example 1, and a latex is prepared as in Example V.

EXAMPLE IX

Laminates of a filling sateen cloth and a polyurethane lacquer top-coat are prepared using the latices made from the quaternized polyurethanes in Examples I, VII, and VIII. A silicone treated released paper was coated with a polyurethane lacquer top-coat (Witcobond Y-308, Witco Chemical Corporation) and dried at 110°C. in a circulating air oven. The above latices are applied as a tie-coat to a wet thickness of 10–15 mils; then the filling sateen is smoothly applied to complete the laminate. After drying at room temperature overnight followed by 10 minutes at about 110°C, peel strength tests of the laminate, as determined by an Instron Tester, are excellent. The laminates show substantially no change (delamination) after several washings in 145°F. water and in perchlororethylene.

EXAMPLE X

This example illustrates that films of poor quality are produced from a latex prepared from a quaternized polyurethane prepolymer wherein the components and stoichiometry are the same as in Example I, but wherein the order of addition is changed.

|  |  | Weight (grams) | Equivalent |
| --- | --- | --- | --- |
| (1) | Polyoxypropylene glycol of M.W. 2000 having a hydroxyl number of 56 | 100 | 0.100 |
| (2) | Tolylene diisocyanate (80% 2,4- and 20% 2,6-) | 34.80 | 0.400 |
| (3) | N-methyl diethanolamine | 5.95 | 0.100 |
| (4) | Dimethyl sulfate | 6.30 | 0.050 |
| (5) | Acetone (dry) | 15 | — |

To a 500 ml. four necked flask equipped with stirrer, thermometer, and gas inlet tube is charged polyoxypropylene glycol (1) which is heated to 90°C. and dehydrated under reduced pressure using a water aspirator for about 0.5 hours. After dehydration the flask is cooled to about 50°C. and blanketed with $N_2$. Tolylene diisocyanate (2) is added with good stirring. The reaction mixture is again heated to 90°C. for about 1 hour and then left to cool to about 50°C. At this time N-methyl diethanolamine (3) in 15g dry acetone (5) is added. This mixture is stirred for 30 minutes at 60°C. Dimethyl sulfate (4) is added and reacted for another 30 minutes at 60°C. The NCO content of the quaternized polyetherurethane prepolymer is 5.3. This quaternized prepolymer is used to make a latex as in Example V, and a film is cast as in Example VI. Although the latex appears to remain in a stable dispersion for about 1 month, the films produced when utilizing this dispersion are so poor that film properties are not determinable.

EXAMPLE XI

This example illustrates that films of poor quality result from quaternized polyetherurethane prepolymers having similar ingredients but of different stoichiometry, than herein described and claimed, and using more than 20% solvent.

|  |  | Weight (grams) | Equiv. |
| --- | --- | --- | --- |
| (1) | Polyoxypropylene glycol of M.W. 2000 having a hydroxyl number of 56 | 500 | 0.500 |
| (2) | N-methyl diethanolamine | 10.00 | 0.168 |
| (3) | Tolylene diisocyanate (80% 2,4- and 20% 2,6-) | 136.46 | 1.58 |
| (4) | Dimethyl sulfate | 10.57 | 0.084 |
| (5) | Acetone (dry) | 50 | ml. |
| (6) | Acetone (dry) | 100 | ml. |

To a 5 liter four necked flask equipped with stirrer, thermometer, and gas inlet tube is charged polyoxypropylene glycol (1) which is heated to 80°C. and dehydrated under reduced pressure using a water aspirator for about 0.5 hours. After dehydration the flask is cooled to about 25°C. and blanketed with $N_2$ before the N-methyl diethanolamine (2) in dry acetone (5) is introduced, after which the tolylene diisocyanate (3) is added with good stirring. A water reflux condenser is fitted to the flask and the reaction temperature is brought to about 55°C. This temperature is maintained for about 1.5 hours. At this time the dimethyl sulfate (4) and acetone (6) are added. The reaction is continued for another hour at 55°C. The NCO content of the quaternized polyetherurethane prepolymer is about 5.0. Another 650 ml. of dry acetone are added to the prepolymer at this point.

This quaternized prepolymer is converted to a latex as described in Example V, and a film is cast as described in Example VI. The latex settles out on standing, and the film produced therewith is unacceptable because of poor physical and mechanical properties.

EXAMPLE XII

A quaternized prepolymer prepared as in Example XI, from which a latex is prepared as described in Example V, but in the presence of 7g. of tetraethylene pentamine chain extender and without surfactant. A lumpy latex containing settled polymer chunks results. Film preparation is not feasible because of the precipitated solids.

EXAMPLE XIII

A quaternized prepolymer and latex, is prepared as in Example XII but using both tetraethylene pentamine and Igepal CO730 surfactant to prepare the latex. A film prepared as described in Example VI, although cohesive possesses similar poor physical and mechanical properties as that of Example XI.

Having thus described our invention, we claim:

1. A storage stable latex of a quaternized substantially linear polyetherurethane-urea, comprising the reaction product of a mixture of a polyoxyalkylene polyol and an N-lower alkyl diaklanolamine, said polyoxyalkylene polyol being selected from diols, triols, and mixtures thereof having a hydroxyl number in the range of about 10–200, with excess diisocyanate, quaternized with a di-lower alkyl sulfate, and chain extending the resultant quaternized isocyanate terminated polyetherurethane with water, and dispersing the resultant quaternized substantially linear polyetherurethane-urea in water, in the presence of from about 0.5 to 5.0%, based on the quaternized polyetherurethane, of an ethoxylated long chain alkyl phenol surfactant, having an HLB of about 14–16, said quaternized sustantially linear isocyanate terminated polyetherurethane comprising a proportion of equivalents in ranges of about 0.8–1.2:0.8–1.2:3–5:0.4–0.6 of said polyoxyalkylene polyol, N-alkyl dialkanolamine, diisocyanate and dialkyl sulfate, respectively, the equivalency of the dialkanolamine being the hydroxyl equivalency.

2. A latex as in claim 1, wherein the proportion of equivalents of said isocyanate terminated polyetherurethane is about 1:1:4:0.5.

3. A latex as in claim 1, wherein the diisocyanate is tolylene diisocyanate.

4. A latex as in claim 1, wherein the diisocyanate is 4,4'-dicyclohexylmethyl diisocyanate.

5. A latex as in claim 1, wherein the polyoxyalkylene polyol is a polyoxypropylene glycol having a hydroxyl number of about 20–80.

6. A latex as in claim 1, wherein the polyoxyalkylene polyol is a polyoxypropylene glycerol having a hydroxyl number of about 20–80.

7. A latex as in claim 1, wherein the N-lower alkyl dialkanolamine is N-methyl diethanolamine.

8. A latex as in claim 1, wherein the quaternizing agent is dimethyl sulfate.

9. A latex as in claim 1, wherein the quaternary polyetherurethane is prepared in an organic solvent, and said organic solvent is substantially removed after dispersing in water.

10. A latex as in claim 9, wherein up to 20 weight percent of organic solvent is employed based on the quaternary polyetherurethane.

11. A latex as in claim 9, wherein the solvent is acetone.

12. A latex as in claim 1, wherein a thickening agent is added to said dispersion to increase the viscosity.

13. The film produced by drying the latex of claim 1.

14. The adhesive produced by drying the latex of claim 1.

* * * * *